US010607622B2

(12) United States Patent
Kim et al.

(10) Patent No.: US 10,607,622 B2
(45) Date of Patent: Mar. 31, 2020

(54) DEVICE AND METHOD FOR PROCESSING INTERNAL CHANNEL FOR LOW COMPLEXITY FORMAT CONVERSION

(71) Applicant: SAMSUNG ELECTRONICS CO., LTD., Suwon-si (KR)

(72) Inventors: Sun-min Kim, Yongin-si (KR); Sang-bae Chon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/580,506

(22) PCT Filed: Jun. 17, 2016

(86) PCT No.: PCT/KR2016/006497
§ 371 (c)(1),
(2) Date: Dec. 7, 2017

(87) PCT Pub. No.: WO2016/204583
PCT Pub. Date: Dec. 22, 2016

(65) Prior Publication Data

US 2018/0233157 A1 Aug. 16, 2018

Related U.S. Application Data

(60) Provisional application No. 62/181,113, filed on Jun. 17, 2015.

(51) Int. Cl.
*G10L 19/008* (2013.01)
*G10L 19/16* (2013.01)
(Continued)

(52) U.S. Cl.
CPC .......... *G10L 19/173* (2013.01); *G10L 19/008* (2013.01); *H04S 3/008* (2013.01); *H04S 2400/03* (2013.01)

(58) Field of Classification Search
None
See application file for complete search history.

(56) References Cited

U.S. PATENT DOCUMENTS

| | | | | |
|---|---|---|---|---|
| 6,370,459 B1 * | 4/2002 | Phillips | ................ | B62D 5/0436 180/443 |
| 8,099,449 B1 * | 1/2012 | Schultz | ................ | H04L 9/0866 708/250 |

(Continued)

FOREIGN PATENT DOCUMENTS

| | | |
|---|---|---|
| CN | 101981616 A | 2/2011 |
| CN | 102157149 A | 8/2011 |

(Continued)

OTHER PUBLICATIONS

Chon, et al., "Technical Description on Internal Channel" Oct. 2015, ISO/IEC JTC1/SC29/WG11 MPEG2014/ m37031, 16 pages total.

(Continued)

*Primary Examiner* — Seong-Ah A Shin
(74) *Attorney, Agent, or Firm* — Sughrue Mion, PLLC

(57) ABSTRACT

A method of processing an audio signal, according to an embodiment of the present invention for solving the technical problem, further includes: receiving a signal for one channel pair element (CPE) to which internal channel gains (ICGs) have been pre-applied; when a reproduction channel configuration is not stereo, acquiring inverse ICGs for the one CPE based on Motion Picture Experts Group surround 212 (MPS212) parameters and on rendering parameters corresponding to MPS212 output channels defined in a format converter; and generating output signals based on the received signal for the one CPE and the acquired inverse ICGs.

7 Claims, 4 Drawing Sheets

(51) Int. Cl.
*H04N 21/233* (2011.01)
*H04S 3/00* (2006.01)

(56) References Cited

U.S. PATENT DOCUMENTS

| | | | | |
|---|---|---|---|---|
| 8,325,929 | B2 | 12/2012 | Koppens et al. | |
| 8,705,770 | B2 | 4/2014 | Liang | |
| 9,105,265 | B2 | 8/2015 | Wu et al. | |
| 2008/0262854 | A1 | 10/2008 | Jung et al. | |
| 2009/0274308 | A1* | 11/2009 | Oh | G10L 19/008 381/2 |
| 2010/0169102 | A1 | 7/2010 | Samsudin et al. | |
| 2010/0174548 | A1* | 7/2010 | Beack | G10L 19/008 704/503 |
| 2011/0019829 | A1 | 1/2011 | Morii | |
| 2011/0264456 | A1 | 10/2011 | Koppens et al. | |
| 2012/0308018 | A1 | 12/2012 | Miao et al. | |
| 2014/0016785 | A1* | 1/2014 | Neuendorf | G10L 19/008 381/22 |
| 2014/0116785 | A1 | 1/2014 | Neuendorf et al. | |
| 2016/0104491 | A1 | 4/2016 | Lee et al. | |
| 2016/0157040 | A1* | 6/2016 | Ertel | G10L 19/008 381/18 |
| 2016/0232901 | A1* | 8/2016 | Ghido | G10L 19/008 |
| 2016/0330560 | A1 | 11/2016 | Chon et al. | |

FOREIGN PATENT DOCUMENTS

| | | | |
|---|---|---|---|
| CN | 102157152 | A | 8/2011 |
| CN | 102187691 | A | 9/2011 |
| CN | 102222503 | A | 10/2011 |
| CN | 103620679 | A | 3/2014 |
| EP | 3 285 257 | A1 | 2/2018 |
| KR | 10-0891688 | B1 | 4/2009 |
| WO | 2014175669 | A1 | 10/2014 |
| WO | 2015/105393 | A1 | 7/2015 |

OTHER PUBLICATIONS

Chon, et al.,, "Proposed Internal Channel for Low Complexity Format Conversion", Jun. 2015, ISO/IEC JTC1/SC29/WG11 MPEG2014/ m35858, 15 pages total.

Beack, et al., "Overview of MPEG-H 3D Audio Standard Activities", Jul. 2013, vol. 36, No. 1, 6 pages total, Cited in International Search Report and Written Opinion dated Sep. 19, 2016 in International App. No. PCT/KR2016/006497.

Herre, et al., "MPEG Surround—The ISO/MPEG Standard for Efficient and Compatible Multichannel Audio Coding," Nov. 2008 J. Audio Eng. Soc., vol. 56, No. 11, 26 pages total.

International Search Report and Written Opinion (PCT/ISA/210 & PCT/ISA/237) dated Sep. 19, 2016 issued by the International Searching Authority in counterpart International Application No. PCT/KR2016/006497.

Communication dated Apr. 11, 2018, issued by the European Patent Office in counterpart European Application No. 16811996.4.

Chon, S. et al. "Proposed Internal Channel for Low Complexity Format Conversion", Jun. 2015, ISO/IEC JTC1/SC29/WG11 MPEG2014/ m36447, 14 pages total XP030064815.

Communication dated Oct. 15, 2019 issued by the State Intellectual Property Office of P.R. China in counterpart Chinese Application No. 201680035624.4.

Communication dated Sep. 26, 2019 issued by the European Patent Office in counterpart European Application No. 16 811 996.4.

* cited by examiner

[Fig. 1]
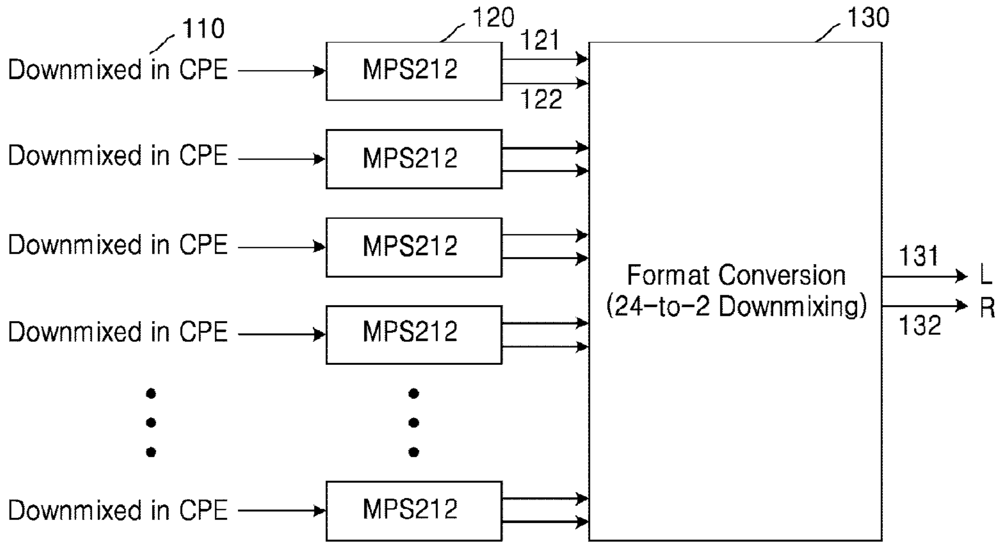

[Fig. 2]
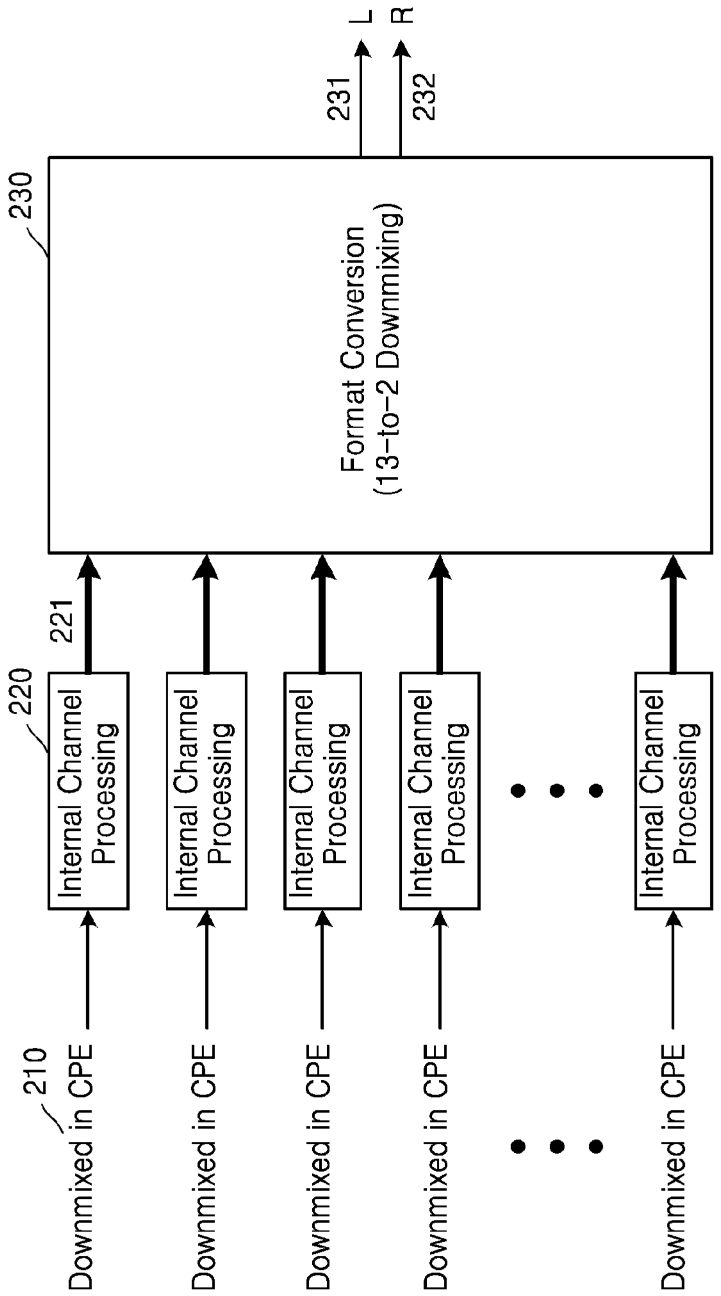
[Fig. 3]
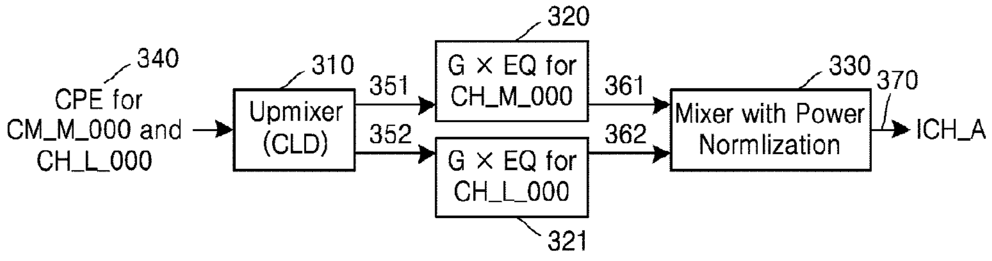

[Fig. 4]
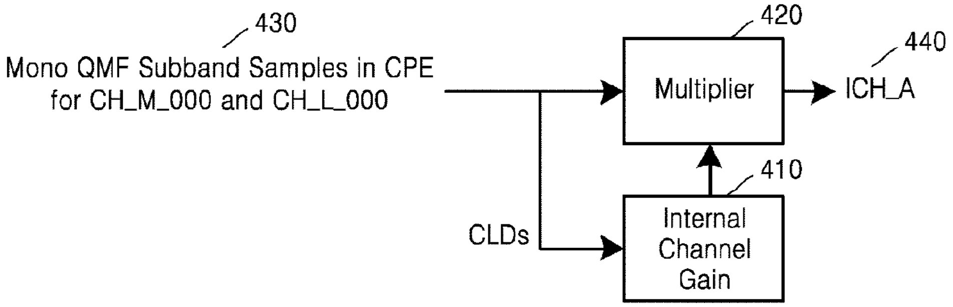
[Fig. 5]
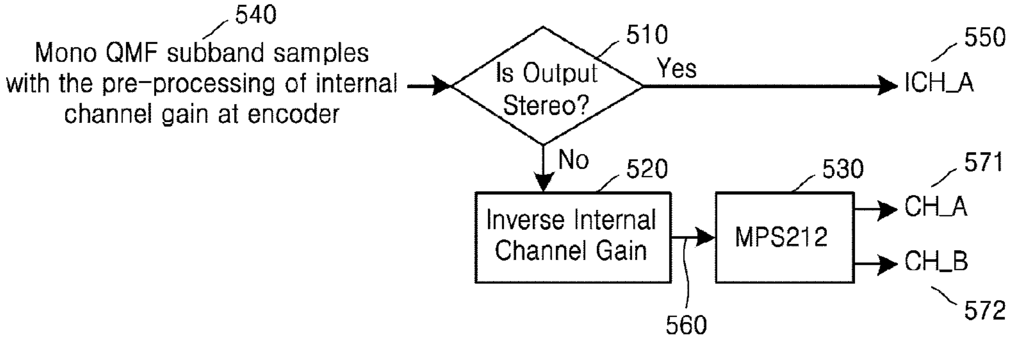

[Fig. 6]

[Table 1]

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 0 | 1 | 0 | 1 | 1 | 1 | 0 | 1 | 0 | 1 | 1 | 1 | 0 | 1 | 0 | 1 | 1 | 1 | 0 | 1 | 0 | 1 | 1 | 1 | 0 |
| 1 | 0 | 1 | 1 | 1 | 0 | 1 | 0 | 1 | 1 | 1 | 0 | 1 | 0 | 1 | 1 | 1 | 0 | 1 | 0 | 1 | 1 | 1 | 0 | 1 |
| 2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 3 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 4 | 1 | 0 | 1 | 1 | 1 | 0 | 1 | 0 | 1 | 1 | 1 | 0 | 1 | 0 | 1 | 1 | 1 | 0 | 1 | 0 | 1 | 1 | 1 | 0 |
| 5 | 0 | 1 | 1 | 1 | 0 | 1 | 0 | 1 | 1 | 1 | 0 | 1 | 0 | 1 | 1 | 1 | 0 | 1 | 0 | 1 | 1 | 1 | 0 | 1 |
| 6 | 1 | 0 | 1 | 1 | 1 | 0 | 1 | 0 | 1 | 1 | 1 | 0 | 1 | 0 | 1 | 1 | 1 | 0 | 1 | 0 | 1 | 1 | 1 | 0 |
| 7 | 0 | 1 | 1 | 1 | 0 | 1 | 0 | 1 | 1 | 1 | 0 | 1 | 0 | 1 | 1 | 1 | 0 | 1 | 0 | 1 | 1 | 1 | 0 | 1 |
| 8 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 9 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 10 | 1 | 0 | 1 | 1 | 1 | 0 | 1 | 0 | 1 | 1 | 1 | 0 | 1 | 0 | 1 | 1 | 1 | 0 | 1 | 0 | 1 | 1 | 1 | 0 |
| 11 | 0 | 1 | 1 | 1 | 0 | 1 | 0 | 1 | 1 | 1 | 0 | 1 | 0 | 1 | 1 | 1 | 0 | 1 | 0 | 1 | 1 | 1 | 0 | 1 |
| 12 | 1 | 0 | 1 | 1 | 1 | 0 | 1 | 0 | 1 | 1 | 1 | 0 | 1 | 0 | 1 | 1 | 1 | 0 | 1 | 0 | 1 | 1 | 1 | 0 |
| 13 | 0 | 1 | 1 | 1 | 0 | 1 | 0 | 1 | 1 | 1 | 0 | 1 | 0 | 1 | 1 | 1 | 0 | 1 | 0 | 1 | 1 | 1 | 0 | 1 |
| 14 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 15 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 16 | 1 | 0 | 1 | 1 | 1 | 0 | 1 | 0 | 1 | 1 | 1 | 0 | 1 | 0 | 1 | 1 | 1 | 0 | 1 | 0 | 1 | 1 | 1 | 0 |
| 17 | 0 | 1 | 1 | 1 | 0 | 1 | 0 | 1 | 1 | 1 | 0 | 1 | 0 | 1 | 1 | 1 | 0 | 1 | 0 | 1 | 1 | 1 | 0 | 1 |
| 18 | 1 | 0 | 1 | 1 | 1 | 0 | 1 | 0 | 1 | 1 | 1 | 0 | 1 | 0 | 1 | 1 | 1 | 0 | 1 | 0 | 1 | 1 | 1 | 0 |
| 19 | 0 | 1 | 1 | 1 | 0 | 1 | 0 | 1 | 1 | 1 | 0 | 1 | 0 | 1 | 1 | 1 | 0 | 1 | 0 | 1 | 1 | 1 | 0 | 1 |
| 20 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 21 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 22 | 1 | 0 | 1 | 1 | 1 | 0 | 1 | 0 | 1 | 1 | 1 | 0 | 1 | 0 | 1 | 1 | 1 | 0 | 1 | 0 | 1 | 1 | 1 | 0 |
| 23 | 0 | 1 | 1 | 1 | 0 | 1 | 0 | 1 | 1 | 1 | 0 | 1 | 0 | 1 | 1 | 1 | 0 | 1 | 0 | 1 | 1 | 1 | 0 | 1 |

140 170 160 180 150 190

DEVICE AND METHOD FOR PROCESSING INTERNAL CHANNEL FOR LOW COMPLEXITY FORMAT CONVERSION

TECHNICAL FIELD

The present invention relates to a device and method for processing internal channel for low complexity format conversion and, more specifically, to a device and method for reducing the number of input channels of a format converter by performing internal channel processing on input channels in a stereo output layout environment, thereby reducing the number of covariance operations to be performed by the format converter.

BACKGROUND ART

Motion Picture Experts Group (MPEG)-H three-dimensional (3D) audio can process various types of signals, and functions as a solution for next-generation audio signal processing since control of an input and output form is easy. In addition, due to a tendency of miniaturization of devices and trends of the present times, a proportion of audio being reproduced by mobile devices in a stereo reproduction environment is increasing.

When an immersive audio signal implemented by multiple channels such as 22.2 channels is transmitted to a stereo reproduction system, all input channels must be decoded, and the immersive audio signal must be down-mixed and converted into a stereo format.

As the number of input channels increases, and as the number of output channels decreases, complexity of a decoder required for covariance analysis and phase alignment in a decoding and conversion process increases. This increase in complexity significantly influences not only an operation speed of a mobile device but also battery consumption.

DETAILED DESCRIPTION OF THE INVENTION

Technical Problem

As described above, when decoding is performed in an environment in which the number of output channels decreases for the sake of portability while the number of input channels increases to provide an immersive sound, a complexity for format conversion becomes a problem.

The objectives of the present invention are to solve the problems of the prior art, which have been described above, and to reduce a complexity of format conversion in a decoder.

Technical Solution

The representative configurations of the present invention to achieve the objectives are as follows.

According to an embodiment of the present invention, a method of processing an audio signal further includes: receiving a signal for one channel pair element (CPE) to which internal channel gains (ICGs) have been pre-applied; when a reproduction channel configuration is not stereo, acquiring inverse ICGs for the one CPE based on Motion Picture Experts Group surround 212 (MPS212) parameters and on rendering parameters corresponding to MPS212 output channels defined in a format converter; and generating output signals based on the received signal for the one CPE and the acquired inverse ICGs.

According to an embodiment of the present invention, a device for processing an audio signal includes: a receiving unit configured to receive a signal for one channel pair element (CPE) to which internal channel gains (ICGs) have been pre-applied; and an output signal generation unit configured to, when a reproduction channel configuration is not stereo, acquire inverse ICGs for the one CPE based on MPS212 parameters and on rendering parameters corresponding to MPS212 output channels defined in a format converter and generate output signals based on the received signal for the one CPE and the acquired inverse ICGs.

The inverse ICGs $IG_{ICH}^{l,m}$ may be determined by $$IG_{ICH}^{l,m} = \frac{1}{\sqrt{\left(c_{left}^{l,m} \times G_{left} \times G_{EQ,left}^{m}\right)^2 + \left(c_{right}^{l,m} \times G_{right} \times G_{EQ,right}^{m}\right)^2}},$$

where l denotes a time slot index, m denotes a frequency band index, $c_{left}^{l,m}$ and $c_{right}^{l,m}$ denote channel level difference (CLD) values of an lth time slot of the MPS212 parameters, $G_{left}$ and $G_{right}$ denote panning gain values among the rendering parameters, and $G_{EQ,left}^{m}$ and $G_{EQ,right}^{m}$ denote equalization (EQ) gain values of an mth frequency band among the rendering parameters.

The audio signal may be an immersive audio signal.

According to an embodiment of the present invention, a computer-readable recording medium has recorded thereon a program for executing the method described above.

Besides, other methods, other systems, and computer-readable recording media having recorded thereon a program for executing the methods are further provided.

Advantageous Effects of the Invention

According to the present invention, an internal channel may be used to reduce the number of channels to be inputted to a format converter, thereby reducing a complexity of the format converter. In more detail, by reducing the number of channels to be inputted to the format converter, a covariance analysis to be performed by the format converter may be simplified, thereby reducing the complexity.

In addition, by applying an internal channel gain (ICG) when an encoder generates a channel pair element (CPE) signal by using Motion Picture Experts Group surround (MPS), a computation amount of a decoder may be further reduced. However, when a reproduction channel is not stereo, the decoder must restore an original signal by inversely applying the ICG applied in the encoder.

DESCRIPTION OF THE DRAWINGS

FIG. 1 illustrates an embodiment of a decoding structure for format-converting 24 input channels into stereo output channels.

FIG. 2 illustrates an embodiment of a decoding structure for format-converting a 22.2-channel immersive audio signal into stereo output channels by using 13 internal channels.

FIG. 3 illustrates an embodiment of generating one internal channel from one channel pair element (CPE).

FIG. 4 is a detailed block diagram of a unit configured to apply an internal channel gain (ICG) to an internal channel signal in a decoder, according to an embodiment of the present invention.

FIG. 5 is a decoding block diagram of a case where an ICG is pre-processed in an encoder, according to an embodiment of the present invention.

FIG. 6 shows Table 1 illustrating an embodiment of a mixing matrix of a format converter configured to render a 22.2-channel immersive audio signal to a stereo signal.

Table 2 illustrates an embodiment of a mixing matrix of a format converter configured to render a 22.2-channel immersive audio signal to a stereo signal by using internal channels.

Table 3 illustrates a channel pair element (CPE) structure for configuring 22.2 channels to internal channels, according to an embodiment of the present invention.

Table 4 illustrates types of internal channels corresponding to decoder input channels, according to an embodiment of the present invention.

Table 5 illustrates locations of channels additionally defined according to internal channel types, according to an embodiment of the present invention.

Table 6 illustrates output channels of the format converter, which correspond to internal channel types, and a gain and an equalization (EQ) gain to be applied to each output channel, according to an embodiment of the present invention.

Table 7 illustrates speakerLayoutType according to an embodiment.

Table 8 illustrates a syntax of SpeakerConfig3( ), according to an embodiment of the present invention.

Table 9 illustrates immersiveDownmixFlag according to an embodiment of the present invention.

Table 10 illustrates a syntax of SAOC3DgetNumChannels( ), according to an embodiment of the present invention.

Table 11 illustrates a channel allocation order according to an embodiment of the present invention.

Table 12 illustrates a syntax of mpegh3daChannelPairElementConfig( ), according to an embodiment of the present invention.

BEST MODE

According to an embodiment of the present invention, a method of processing an audio signal includes: receiving an audio bitstream encoded using Motion Picture Experts Group surround 212 (MPS212); generating an internal channel signal for one channel pair element (CPE) based on the received audio bitstream and on rendering parameters for MPS212 output channels defined in a format converter; allocating a group of internal channels based on code codec output channel locations; and generating stereo channel output signals based on the generated internal channel signal and the allocated group of the internal channels.

MODE OF THE INVENTION

The detailed description of the present invention, which is described below, refers to the accompanying drawings showing specific embodiments, in which the present invention can be carried out, as examples. These embodiments are described in detail enough for those of ordinary skill in the art to carry out the present invention. It should be understood that various embodiments of the present invention differ from each other but do not have to be exclusive to each other.

For example, a specific shape, structure, and characteristic described in the present specification can be changed and implemented from one embodiment to another embodiment without departing from the spirit and scope of the present invention. In addition, it should be understood that a location or arrangement of an individual component in each embodiment can also be changed without departing from the spirit and scope of the present invention. Therefore, the detailed description described below is not made for purposes of limitation, and it should be considered that the scope of the present invention includes the scope claimed by the claims and all scopes equivalent to the claims.

Like reference numerals in the drawings denote like elements in various aspects. In addition, in the drawings, parts irrelevant to the description are omitted to clearly describe the present invention, and like reference numerals denote like elements throughout the specification.

Hereinafter, embodiments of the present invention will be described in detail with reference to the accompanying drawings so that those of ordinary skill in the art may easily realize the present invention. However, the present invention may be embodied in many different forms and should not be construed as being limited to the embodiments set forth herein.

Throughout the specification, when it is described that a certain part is "connected" to another part, this includes not only a case of "being directly connected" but also a case of "being electrically connected" via another element in the middle. In addition, when a certain part "includes" a certain component, this indicates that the part may further include another component instead of excluding another component unless there is different disclosure.

The terms used in the present specification are defined as follows.

"Internal channel (IC)" is a virtual intermediate channel used in a format conversion process to remove an unnecessary operation occurring during Motion Picture Experts Group surround stereo 212 (MPS212) up-mixing and format converter (FC) down-mixing and considers a stereo output.

"Internal channel signal" is a mono-signal mixed by an FC to provide a stereo signal and is generated using an internal channel gain (ICG).

"Internal channel processing" indicates a process of generating an internal channel signal based on an MPS212 decoding block and is performed by an internal channel processing block.

"ICG" indicates a gain applied to an internal channel signal, the gain being calculated from a channel level difference (CLD) value and format conversion parameters.

"Internal channel group" indicates a type of an internal channel determined based on a core codec output channel location, and core codec output channel locations and internal channel groups are defined in Table 4 (described below).

Hereinafter, the present invention will be described in detail with reference to the accompanying drawings.

FIG. 1 illustrates an embodiment of a decoding structure for format-converting 24 input channels into stereo output channels.

When a bitstream of a multi-channel input is transmitted to a decoder, the decoder down-mixes the bitstream such that an input channel layout is matched with an output channel layout of a reproduction system. For example, as shown in FIG. 1, when a 22.2-channel input signal conforming to the MPEG standard is reproduced by a stereo channel output system, an FC 130 included in the decoder down-mixes a 24-input channel layout to a 2-output channel layout according to an FC rule fixed inside the FC.

In this case, the 22.2-channel input signal input to the decoder includes channel pair element (CPE) bitstreams 110 in which signals for two channels included in one CPE are down-mixed. Since a CPE bitstream is encoded using MPEG surround based stereo 212 (MPS212), the received CPE bitstream is decoded using an MPS212 120. Herein, a low frequency effect (LFE) channel, i.e., a woofer channel, is not configured using CPE. Therefore, a 22.2-channel input is configured by 11 bitstreams for CPE and two bitstreams for woofer channels.

When MPS212 decoding on the CPE bitstreams configuring the 22.2-channel input signal is performed, two MPS212 output channels 121 and 122 for each CPE are generated, and the output channels 121 and 122 decoded using the MPS212 become input channels of the FC. In the case as shown in FIG. 1, the number Nin of input channels of the FC is 24 including the woofer channels. Therefore, the FC must perform 24*2 down-mixing.

The FC performs phase alignment according to a covariance analysis to prevent timbral distortion due to a phase difference between multi-channel signals. In this case, a covariance matrix has Nin×Nin dimensions, and thus to analyze the covariance matrix, (Nin×(Nin−1)/2+Nin)×71 band×2×16×(48000/2048) complex multiplications must be logically performed.

When the number Nin of input channels is 24, four operations must be performed for one complex multiplication, and thus the performance of about 64 million operations per second (MOPS) is required.

Table 1 illustrates an embodiment of a mixing matrix of an FC configured to render a 22.2-channel immersive audio signal to a stereo signal.

Table 1 is shown in FIG. 6.

In the mixing matrix of Table 1, a horizontal axis 140 and a vertical axis 150 number 24 input channels, but the sequence thereof is not largely meant in a covariance analysis. In the embodiment disclosed with reference to Table 1, when each element of the mixing matrix has a value of 1 (160), a covariance analysis is necessary, but when each element of the mixing matrix has a value of 0 (170), a covariance analysis may be omitted.

For example, for input channels such as CM_M_L030 and CH_M_R030 channels which are not mixed with each other in a process of converting a format to a stereo output layout, values of corresponding elements in the mixing matrix are 0, and a covariance analysis process between the CM_M_L030 and CH_M_R030 channels which are not mixed with each other may be omitted.

Therefore, 128 covariance analyses on input channels which are not mixed with each other among 24×24 covariance analyses may be omitted.

In addition, since the mixing matrix is symmetrically configured along input channels, the mixing matrix in Table 1 may be divided into a lower part 190 and an upper part 180 on the basis of a diagonal line to omit a covariance analysis on an area corresponding to the lower part. In addition, a covariance analysis on only portions with a bold font in an area corresponding to the upper part on the basis of the diagonal line is performed, and thus finally 236 covariance analyses are performed.

As described above, when an unnecessary covariance analysis process is omitted by using cases where a value of the mixing matrix is 0 (channels which are not mixed with each other) and the symmetry of the mixing matrix, 236×71 band×2×16×(48000/2048) complex multiplications must be performed for the covariance analyses.

Therefore, in this case, 50 MOPS are required, and thus there is an effect that a system load due to covariance analysis is improved than a case where covariance analysis is performed for the entire mixing matrix.

FIG. 2 illustrates an embodiment of a decoding structure for format-converting a 22.2-channel immersive audio signal into stereo output channels by using 13 internal channels.

Motion Picture Experts Group (MPEG)-H three-dimensional (3D) audio uses CPE to relatively efficiently transmit a multi-channel audio signal in a limited transmission environment. When two channels corresponding to one channel pair are mixed to a stereo layout, inter-channel correlation (ICC) is set to 1, accordingly a decorrelator is not applied thereto, and thus the two channels have the same phase information.

That is, when a channel pair included in each CPE is determined by considering a stereo output, up-mixed channel pairs have the same panning coefficient (to be described below).

One internal channel is generated by mixing two in-phase channels included in one CPE. One internal channel is mown-mixed on the basis of a mixing gain and an equalization (EQ) value according to an FC conversion rule when two input channels included in the internal channel is converted into a stereo output channel. In this case, since the channel pair included in the one CPE is in-phase channels, a process of aligning an inter-channel phase after the down-mixing is not necessary.

Although stereo output signals of an MPS212 up-mixer do not have a phase difference therebetween, this is not considered in the embodiment disclosed with reference to FIG. 1, and thus complexity increases unnecessarily. When a reproduction layout is stereo, the number of input channels of an FC may be reduced by using one internal channel instead of an up-mixed CPE channel pair as an input to the FC.

In the embodiment disclosed with reference to FIG. 2, instead of a process of generating two channels by MPS212-up-mixing a CPE bitstream 210, one internal channel 221 is generated by performing internal channel processing 220 on the CPE bitstream. In this case, woofer channels are not configured using CPE, and thus each woofer channel signal becomes an internal channel signal.

In the embodiment disclosed with reference to FIG. 2, when a case of 22.2 channels is assumed, Nin=13 internal channels including internal channels for 11 CPEs corresponding to 22 general channels and internal channels for two woofer channels are logically input channels to the FC. Therefore, 13×2 down-mixing is performed by the FC.

As described above, for a stereo reproduction layout, an internal channel may be used to additionally remove an unnecessary process occurring in a process of up-mixing through MP212 and down-mixing through format conversion again, thereby relatively more reducing complexity of a decoder.

When a mixing matrix value $M_{mix}(i,j)$ for two output channels i and j with respect to one CPE is 1, an ICC is set to $ICC^{l,m}=1$, and a decorrelation and residual processing operation may be omitted.

An internal channel is defined as a virtual intermediate channel corresponding to an input to an FC. As shown in FIG. 2, each internal channel processing block 220 generates an internal channel signal by using an MPS212 payload such as channel level difference (CLD) and rendering parameters such as EQ and gain values. Herein, the EQ and gain values indicate rendering parameters for output channels of an MPS212 block, which are defined in a conversion rule table of an FC.

Table 2 illustrates an embodiment of a mixing matrix of an FC configured to render a 22.2-channel immersive audio signal to a stereo signal by using internal channels.

TABLE 2

| | A | B | C | D | E | F | G | H | I | J | K | L | M |
|---|---|---|---|---|---|---|---|---|---|---|---|---|---|
| A | 1 | 1 | 1 | 1 | 1 | 1 | 1 | 1 | 1 | 1 | 1 | 1 | 1 |
| B | 1 | 1 | 1 | 1 | 1 | 1 | 1 | 1 | 1 | 1 | 1 | 1 | 1 |
| C | 1 | 1 | 1 | 1 | 1 | 1 | 1 | 1 | 1 | 1 | 1 | 1 | 1 |
| D | 1 | 1 | 1 | 1 | 1 | 1 | 1 | 1 | 1 | 1 | 1 | 1 | 1 |
| E | 1 | 1 | 1 | 1 | 1 | 1 | 1 | 1 | 1 | 1 | 1 | 1 | 1 |
| F | 1 | 1 | 1 | 1 | 1 | 1 | 1 | 1 | 1 | 0 | 0 | 0 | 0 |
| G | 1 | 1 | 1 | 1 | 1 | 1 | 1 | 1 | 1 | 0 | 0 | 0 | 0 |
| H | 1 | 1 | 1 | 1 | 1 | 1 | 1 | 1 | 1 | 0 | 0 | 0 | 0 |
| I | 1 | 1 | 1 | 1 | 1 | 1 | 1 | 1 | 1 | 0 | 0 | 0 | 0 |
| J | 1 | 1 | 1 | 1 | 1 | 0 | 0 | 0 | 0 | 1 | 1 | 1 | 1 |
| K | 1 | 1 | 1 | 1 | 1 | 0 | 0 | 0 | 0 | 1 | 1 | 1 | 1 |
| L | 1 | 1 | 1 | 1 | 1 | 0 | 0 | 0 | 0 | 1 | 1 | 1 | 1 |
| M | 1 | 1 | 1 | 1 | 1 | 0 | 0 | 0 | 0 | 1 | 1 | 1 | 1 |

Like Table 1, in the mixing matrix of Table 2, a horizontal axis and a vertical axis indicate indices of input channels, and the sequence thereof is not largely meant in a covariance analysis.

As described above, since a mixing matrix has a symmetrical property on the basis of a diagonal line, in the mixing matrix disclosed with reference to Table 2, covariance analysis on some elements may also be omitted by selecting a configuration of an upper or lower part on the basis of the diagonal line. In addition, covariance analysis may also be omitted for input channels which are not mixed with each other in a process of converting a format to a stereo output layout.

However, unlike the embodiment disclosed with reference to Table 1, in the embodiment disclosed with reference to Table 2, 13 channels including 11 internal channels consisting of 22 general channels and two woofer channels are down-mixed to stereo output channels, and the number Nin of input channels of an FC is 13.

As a result, like Table 2, in an embodiment using an internal channel, 75 covariance analyses are performed, and 19 MOPS are logically required, and thus a load of an FC according to covariance analysis may be significantly reduced when compared with a case of not using an internal channel.

An FC has a down-mix matrix $M_{Dmx}$ defined for down-mixing, and a mixing matrix $M_{Mix}$ is calculated by using $M_{Dmx}$ as follows.

```
MMix = zero Nin × Nin Matrix
for i = 1 to Nout
    for j = 1 to Nin
        set_i = 0
        if MDmx (i, j) > 0.0
            set_i = 1
        end
        for k = 1 to Nin
            set_k = 0
        if MDmx (i, j) > 0.0
            set_k = 1
        end
        if set_i == 1 and set_k == 1
            MMix (j, k) = 1
        end
    end
  end
end
```

Each OTT decoding block outputs two channels corresponding to channel numbers i and j, and when a mixing matrix $M_{Mix}$(i,j) is 1, $ICC_{l,m}$=1 is set, accordingly $H11_{OTT}^{l,m}$ and $H21_{OTT}^{l,m}$ of an up-mix matrix $R_2^{l,m}$ are calculated, and thus a decorrelator is not used.

Table 3 illustrates a CPE structure for configuring 22.2 channels to internal channels, according to an embodiment of the present invention.

When a 22.2-channel bitstream has the same structure as that of Table 3, 13 internal channels may be defined as ICH_A to ICH_M, and a mixing matrix for the 13 internal channels may be defined as Table 2.

A first column of Table 3 indicates an index of an input channel, a first row thereof indicates whether an input channel configures a CPE, mixing gains to stereo channels, and an internal channel index.

TABLE 3

| Input Channel | Element | Mixing Gain to L | Mixing Gain to R | Internal Channel |
|---|---|---|---|---|
| CH_M_000<br>CH_L_000 | CPE | 0.707 | 0.707 | ICH_A |
| CH_U_000<br>CH_T_000 | CPE | 0.707 | 0.707 | ICH_B |
| CH_M_180<br>CH_U_180 | CPE | 0.707 | 0.707 | ICH_C |
| CH_LFE2 | LFE | 0.707 | 0.707 | ICH_D |
| CH_LFE3 | LFE | 0.707 | 0.707 | ICH_E |
| CH_M_L135<br>CH_U_L135 | CPE | 1 | 0 | ICH_F |
| CH_M_L030<br>CH_L_L045 | CPE | 1 | 0 | ICH_G |
| CH_M_L090<br>CH_U_L090 | CPE | 1 | 0 | ICH_H |
| CH_M_L060<br>CH_U_L045 | CPE | 1 | 0 | ICH_I |
| CH_M_R135<br>CH_U_R135 | CPE | 0 | 1 | ICH_J |
| CH_M_R030<br>CH_L_R045 | CPE | 0 | 1 | ICH_K |
| CH_M_R090<br>CH_U_R090 | CPE | 0 | 1 | ICH_L |
| CH_M_R060<br>CH_U_R045 | CPE | 0 | 1 | ICH_M |

For example, for the internal channel ICH_A consisting of one CPE including CM_M_000 and CM_L_000, both values of a mixing gain applied to a left output channel and a mixing gain applied to a right output channel to up-mix this CPE to a stereo output channel are 0.707. That is, signals up-mixed to a left output channel and a right output channel are reproduced at the same volume.

As another example, for the internal channel ICH_F consisting of one CPE including CH_M_L135 and CH_U_L135, to up-mix this CPE to a stereo output channel, a value of a mixing gain applied to a left output channel is 1, and a value of a mixing gain applied to a right output channel is 0. That is, all the signals are reproduced only to the left output channel and are not reproduced to the right output channel.

On the contrary, for the internal channel ICH_J consisting of one CPE including CH_M_R135 and CH_U_R135, to up-mix this CPE to a stereo output channel, a value of a mixing gain applied to a left output channel is 0, and a value of a mixing gain applied to a right output channel is 1. That is, all the signals are not reproduced to the left output channel and are reproduced only to the right output channel.

FIG. 3 illustrates an embodiment of a device configured to generate one internal channel from one CPE.

An internal channel for one CPE may be derived by applying format conversion parameters of a quadrature mirror filter (QMF) domain, such as a CLD, a gain, and EQ, to a down-mixed mono-signal.

The device disclosed with reference to FIG. 3, which generates an internal channel, includes an up-mixer 310, a scaler 320, and a mixer 330.

When a case where a CPE 340 obtained by down-mixing signals of a channel pair of CH_M_000 and CH_L_000 is input is assumed, the up-mixer 310 up-mixes a CPE signal by using a CLD parameter. The CPE signal which has passed through the up-mixer 310 is up-mixed to a signal 351 for CH_M_000 and a signal 352 for CH_L_000, which have the same phase and may be mixed together in an FC.

The up-mixed CH_M_000 channel signal and CH_L_000 channel signal are respectively scaled (320 and 321) for each sub-band on the basis of a gain and EQ corresponding to conversion rule defined in the FC.

When scaled signals 361 and 362 for the channel pair of CH_M_000 and CH_L_000 are generated respectively, the mixer 330 mixes the scaled signals 361 and 362 and power-normalize the mixed signal to generate an internal channel signal ICH_A 370 which is an intermediate channel signal for format conversion.

In this case, for a single channel element (SCE), an woofer channel, and the like which are not up-mixed using CLD, an internal channel is the same as an original input channel.

Since a core codec output using an internal channel is performed in a hybrid QMF domain, a process of ISO IEC23308-3 10.3.5.2 is not processed. To allocate each channel of a core coder, an additional channel allocation rule and down-mix rule such as Tables 4 to 6 are defined.

Table 4 illustrates types of internal channels corresponding to decoder input channels, according to an embodiment of the present invention.

When a decoder input channel corresponds to a woofer channel, i.e., CH_LFE1, CH_LFE2, or CH_LFE3, an internal channel type thereof is determined as CH_I_LFE corresponding to a woofer channel.

When a decoder input channel corresponds to a center channel, i.e., CH_M_000, CH_L_000, CH_U_000, CH_T_000, CH_M_180, or CH_U_180, an internal channel type thereof is determined as CH_I_CNTR corresponding to a center channel.

When an internal channel type is CH_I_CNTR or CH_I_LFE, left and right panning corresponds to (0.707, 0.707), and thus an output signal is reproduced to both an L channel and an R channel of a stereo output channel, an L channel signal and an R channel signal have a uniform magnitude, and a signal after format conversion has the same energy as a signal before the format conversion. However, an LFE channel is not up-mixed from a CPE and is independently encoded from an LFE element.

When a decoder input channel corresponds to a left channel, i.e., CH_M_L022, CH_M_L030, CH_M_L045, CH_M_L060, CH_M_L090, CH_M_L110, CH_M_L135, CH_M_L150, CH_L_L045, CH_U_L045, CH_U_L030, CH_U_L045, CH_U_L090, CH_U_L110, CH_U_L135, CH_M_LSCR, or CH_M_LSCH, an internal channel type thereof is determined as CH_I_LEFT corresponding to a left channel.

When an internal channel type is CH_I_LEFT, left and right panning corresponds to (1, 0), and thus an output signal is reproduced to an L channel of a stereo output channel, and a signal after format conversion has the same energy as a signal before the format conversion.

TABLE 4

| Type | Channels | Panning (L, R) |
|---|---|---|
| CH-I-LFE | CH_LFE1, CH_LFE2, CH_LFE3 | (0.707, 0.707) |
| CH-I-CNTR | CH_M_000, CH_L_000, CH_U_000, CH_T_000, CH_M_180, CH_U_180 | (0.707, 0.707) |
| CH-I-LEFT | CH_M_L022, CH_M_L030, CH_M_L045, CH_M_L060, CH_M_L090, CH_M_L110, CH_M_L135, CH_M_L150, CH_L_L045, CH_U_L045, CH_U_L030, CH_U_L045, CH_U_L090, CH_U_L110, CH_U_L135, CH_M_LSCR, CH_M_LSCH | (1, 0) |
| CH-R-RIGHT | CH_M_R022, CH_M_R030, CH_M_R045, CH_M_R060, CH_M_R090, CH_M_R110, CH_M_R135, CH_M_R150, CH_L_R045, CH_U_R045, CH_U_R030, CH_U_R045, CH_U_R090, CH_U_R110, CH_U_R135, CH_M_RSCR, CH_M_RSCH | (0, 1) |

Internal channels correspond to intermediate channels between a core coder and input channels of an FC and are classified into four types of woofer channel, center channel, left channel, and right channel.

In addition, an internal channel may be panned to a left channel and a right channel, (1, 0), (0, 1), or (0.707, 0.707), of a stereo output channel.

When channel pairs of each type represented by using a CPE are the same internal channel type, the channel pairs have the same panning coefficient and mixing matrix in an FC, and thus an internal channel may be used. That is, when a channel pair included in a CPE has the same internal channel type, internal channel processing thereon may be performed, and thus when a CPE is configured, it is needed to configure the CPE with channels having the same internal channel type.

When a decoder input channel corresponds to a right channel, i.e., CH_M_R022, CH_M_R030, CH_M_R045, CH_M_R060, CH_M_R090, CH_M_R110, CH_M_R135, CH_M_R150, CH_L_R045, CH_U_R045, CH_U_R030, CH_U_R045, CH_U_R090, CH_U_R110, CH_U_R135, CH_M_RSCR, or CH_M_RSCH, an internal channel type thereof is determined as CH_I_RIGHT corresponding to a right channel.

When an internal channel type is CH_I_RIGHT, left and right panning corresponds to (0, 1), and thus an output signal is reproduced to an R channel of a stereo output channel, and a signal after format conversion has the same energy as a signal before the format conversion.

Table 5 illustrates locations of channels additionally defined according to internal channel types, according to an embodiment of the present invention.

TABLE 5

| LoudspeakerGeometry as defined in ISO/IEC 23001-8) | Channel | Azimuth [deg] | Elevation [deg] | Azimuth start angle of sector [deg] | Azimuth end angle of sector [deg] | Elevation start angle of sector [deg] | Elevation end angle of sector [deg] | Ch. is LFE | Position is relative |
|---|---|---|---|---|---|---|---|---|---|
| 43 | CH_I_CNTR | 0 | 0 | 0 | 0 | 0 | 0 | 0 | 0 |
| 44 | CH_I_LFE | 0 | n/a | n/a | n/a | n/a | n/a | 1 | 0 |
| 45 | CH_I_LEFT | 30 | 0 | 30 | 30 | 0 | 0 | 0 | 0 |
| 46 | CH_I_RIGHT | −30 | 0 | −30 | −30 | 0 | 0 | 0 | 0 |

CH_I_LFE is a woofer channel located at an elevation angle of 0°, and CH_I_CNTR corresponds to a channel located at both an elevation angle and an azimuth angle of 0°. CH_I_LFET corresponds to a channel located at a sector having an elevation angle of 0° and an azimuth angle of left 30° to 60°, and CH_I_RIGHT corresponds to a channel located at a sector having an elevation angle of 0° and an azimuth angle of right 30° to 60°.

In this case, locations of newly defined internal channels are not relative locations between channels but absolute locations based on a reference point.

Even for a case of a quadruple channel element (QCE) consisting of a CPE pair, an internal channel may be applied (to be described below).

Two detailed methods of generating an internal channel may be implemented.

The first method is a pre-processing method in an MPG-H 3D audio encoder, and the second method is a post-processing method in an MPG-H 3D audio decoder.

When an internal channel is used in MPEG, Table 5 may be added as a new row to ISO/IEC 23008-3 Table 90.

Table 6 illustrates output channels of an FC, which correspond to internal channel types, and a gain and an EQ gain to be applied to each output channel, according to an embodiment of the present invention.

To use an internal channel, an FC may has an additional rule such as Table 6.

TABLE 6

| Source | Destination | Gain | EQ_index |
|---|---|---|---|
| CH_I_CNTR | CH_M_L030, CH_M_R030 | 1.0 | 0 (off) |
| CH_I_LFE | CH_M_L030, CH_M_R030 | 1.0 | 0 (off) |
| CH_I_LEFT | CH_M_L030 | 1.0 | 0 (off) |
| CH_I_RIGHT | CH_M_L030 | 1.0 | 0 (off) |

An internal channel signal is generated by considering gain and EQ values of an FC. Therefore, as shown in Table 6, an internal channel signal may be generated by using an additional conversion rule in which a gain value is 1 and an EQ index is 0.

When an internal channel type is CH_I_CNTR channel corresponding to a center channel or CH_I_LFE corresponding to a woofer channel, output channels are CH_M_L030 and CH_M_R030. In this case, a gain value is determined as 1, an EQ index is determined as 0, and since two stereo output channels are used, each output channel signal must be multiplied by to maintain power of an output signal.

When an internal channel type is CH_I_LEFT corresponding to a left channel, an output channel is CH_M_L030. In this case, a gain value is determined as 1, an EQ index is determined as 0, and since only a left output channel is used, a gain of 1 is applied to CH_M_L030, and a gain of 0 is applied to CH_M_R030.

When an internal channel type is CH_I_RIGHT corresponding to a right channel, an output channel is CH_M_R030. In this case, a gain value is determined as 1, an EQ index is determined as 0, and since only a right output channel is used, a gain of 1 is applied to CH_M_R030, and a gain of 0 is applied to CH_M_L030.

Herein, for an SCE channel or the like in which an internal channel is the same as an input channel, a general format conversion rule is applied.

When an internal channel is used in MPEG, Table 6 may be added as a new row to ISO/IEC 23008-3 Table 96.

Tables 7 to 12 illustrate parts of an existing standard to be changed to use an internal channel in MPEG. Hereinafter, bitstream configurations and syntaxes which should be added to process an internal channel are described by using Tables 7 to 12.

Table 7 illustrates speakerLayoutType according to an embodiment of the present invention.

For internal channel processing, a speaker layout type speakerLayoutType for an internal channel must be defined. Table 7 illustrates the meaning of each value of speakerLayoutType.

TABLE 7

| Value | Meaning |
|---|---|
| 0 | Loudspeaker layout is signaled by means of ChannelConfiguration index as defined in ISO/IEC 23001-8. |
| 1 | Loudspeaker layout is signaled by means of a list of LoudspeakerGeometry indices as defined in ISO/IEC 23001-8 |
| 2 | Loudspeaker layout is signaled by means of a list of explicit geometric position information. |
| 3 | Loudspeaker layout is signaled by means of LCChannelConfiguration index. Note that the LCChannelConfiguration has same layout with ChannelConfiguration but different channel orders to enable the optimal internal channel structure using CPE. |

When speakerLayoutType==3, a loud speaker layout is signaled by the meaning of an LCChannelConfiguration index. LCChannelConfiguration has the same layout as ChannelConfiguration but has a channel allocation order for enabling an optimal internal channel structure using a CPE.

Table 8 illustrates a syntax of SpeakerConfig3d( ) according to an embodiment of the present invention.

TABLE 8

| Syntax | No. of bits | Mnemonic |
|---|---|---|
| SpeakerConfig3d( ) | | |
| { | | |
| speakerLayoutType; | 2 | uimsbf |
| if (speakerLayoutType == 0 \|\| | | |
| speakerLayoutType == 3) { | | |
| CICPspeakerLayoutIdx; | 6 | uimsbf |
| } | | |
| else { | | |
| numSpeakers = escapedValue(5, 8, 16) + 1; | | |

TABLE 8-continued

| Syntax | No. of bits | Mnemonic |
|---|---|---|
| if (speakerLayoutType == 1 ) { | | |
| for (i = 0; i < numSpeakers; i++) { | | |
| CICPspeakerIdx; | 7 | uimsbf |
| } | | |
| } | | |
| if (speakerLayoutType == 2 ) { | | |
| mpegh3daFlexibleSpeakerConfig(numSpeakers); | | |
| } | | |
| } | | |
| } | | |

As described above, when speakerLayoutType==3, the same layout as that of CICPspeakerLayoutldx is used, but an optimized channel allocation order for an internal channel differs from that of CICPspeakerLayoutldx.

When speakerLayoutType==3, and an output layout is stereo, an input channel number Nin is changed to an internal channel number after a core codec.

Table 9 illustrates immersiveDownmixFlag according to an embodiment of the present invention.

When a speaker layout type for an internal channel is newly defined, immersiveDownmixFlag also have to be corrected. When immersiveDownmixFlag is 1, a syntax for processing a case where speakerLayoutType==3 must be added as shown in Table 12.

Object spreading may be performed only when the following conditions are satisfied.

A local loud speaker configuration is signaled by LoudspeakerRendering( )

the speakerLayoutType must be 0 or 3, and

CICPspeakerLayoutldx has one value of 4, 5, 6, 7, 9, 10, 11, 12, 13, 14, 15, 16, 17, and 18.

TABLE 9

| immersiveDownmixFlag | Meaning |
|---|---|
| 0 | Generic format converter shall be applied as defined in clause 10. |
| 1 | If the local loudspeaker setup, signaled by LoudspeakerRendering( ), is signaled as (speakerLayoutType==0 or 3,CICPspeakerLayoutIdx==5) or as (speakerLayoutType==0 or 3,CICPspeakerLayoutIdx==6), independently of potentially signaled loudspeaker displacement angles, then immersive rendering format converter shall be applied as defined in clause 11. In all other case the generic format converter shall be applied as defined in clause 10. |

Table 10 illustrates a syntax of SAOC3DgetNumChannels( ) according to an embodiment of the present invention.

SAOC3DgetNumChannels must be corrected such that SAOC3DgetNumChannels includes a case where speakerLayoutType==3 as shown in Table 10.

TABLE 10

| Syntax | No. of bits | Mnemonic |
|---|---|---|
| SAOC3DgetNumChannels(Layout) | | Note 1 |
| { | | |
| numChannels = numSpeakers; | | Note 2 |
| for (i = 0; i < numSpeakers; i++) { | | |
| if (Layout.isLFE[i] == 1) { | | |
| numChannels = numChannels − 1; | | |
| } | | |
| } | | |
| return numChannels; | | |
| } | | |

Note 1:
The function SAOC3DgetNumChannels( ) returns the number of available non-LFE channels numChannels.
Note 2:
numSpeakers is defined in Syntax of SpeakerConfig3d( ). If speakerLayoutType == 0 or speakerLayoutType == 3 numSpeakers represents the number of loudspeakers corresponding to the ChannelConfiguration value, CICPspeakerLayoutIdx, as defined in ISO/IEC 23001-8.

Table 11 illustrates a channel allocation order according to an embodiment of the present invention.

Table 11 illustrates the number of channels, ordering, and a possible internal channel type according to a loud speaker layout or LCChannelConfiguration as a channel allocation order newly defined for an internal channel.

TABLE 11

| Loudspeaker Layout Index or LCChannelConfiguration | Number of Channels | Channels (with ordering) | Possible Internal Channel Type |
|---|---|---|---|
| 1 | 1 | CH_M_000 | Center |
| 2 | 2 | CH_M_L030,<br>CH_M_R030 | Left<br>Right |
| 3 | 3 | CH_M_000,<br>CH_M_L030,<br>CH_M_R030 | Center<br>Left<br>Right |
| 4 | 4 | CH_M_000, CH_M180,<br>CH_M_L030,<br>CH_M_R030 | Center<br>Left<br>Right |
| 5 | 5 | CH_M_000,<br>CH_M_L030, CH_M_L110,<br>CH_M_R030, CH_M_R110 | Center<br>Left<br>Right |
| 6 | 6 | CH_M_000,<br>CH_LFE1,<br>CH_M_L030, CH_M_L110,<br>CH_M_R030, CH_M_R110 | Center<br>Left<br>Left<br>Right |
| 7 | 8 | CH_M_000,<br>CH_LFE1,<br>CH_M_L030, CH_M_L110, CH_M_L060,<br>CH_M_R030, CH_M_R110, CH_M_R060 | Center<br>Left<br>Left<br>Right |
| 8 | | n.a. | |
| 9 | 3 | CH_M_180,<br>CH_M_L030,<br>CH_M_R030 | Center<br>Left<br>Right |
| 10 | 4 | CH_M_L030, CH_M_L110,<br>CH_M_R030, CH_M_R110 | Left<br>Right |
| 11 | 7 | CH_M_000, CH_M_180,<br>CH_LFE1,<br>CH_M_L030, CH_M_L110,<br>CH_M_R030, CH_M_R110 | Center<br>Left<br>Left<br>Right |
| 12 | 8 | CH_M_000,<br>CH_LFE1,<br>CH_M_L030, CH_M_L110, CH_M_L135,<br>CH_M_R030, CH_M_R110, CH_M_R135 | Center<br>Left<br>Left<br>Right |
| 13 | 24 | CH_M_000, CH_L_000, CH_U_000,<br>CH_T_000, CH_M_180, CH_T_180,<br>CH_LFE2, CH_LFE3,<br>CH_M_L135, CH_U_L135, CH_M_L030, CH_L_L045,<br>CH_M_L090, CH_U_L090, CH_M_L060, CH_U_L045,<br>CH_M_R135, CH_U_R135, CH_M_R030, CH_L_R045,<br>CH_M_R090, CH_U_R090, CH_M_R060, CH_U_R045 | Center<br>Left<br>Left<br>Right |
| 14 | 8 | CH_M_000,<br>CH_LFE1,<br>CH_M_L030, CH_M_L110, CH_U_L030,<br>CH_M_R030, CH_M_R110, CH_U_R030 | Center<br>Left<br>Left<br>Right |
| 15 | 12 | CH_M_000, CH_U_180,<br>CH_LFE2, CH_LFE3,<br>CH_M_L030, CH_M_L135, CH_M_L090, CH_U_L045,<br>CH_M_R030, CH_M_R135, CH_M_R090, CH_U_R045 | Center<br>Left<br>Left<br>Right |
| 16 | 10 | CH_M_000,<br>CH_LFE1,<br>CH_M_L030, CH_M_L110, CH_U_L030, CH_U_L110,<br>CH_M_R030, CH_M_R110, CH_U_R030, CH_U_R110 | Center<br>Left<br>Left<br>Right |
| 17 | 12 | CH_M_000, CH_U_000, CH_T_000,<br>CH_LFE1,<br>CH_M_L030, CH_M_L110, CH_U_L030, CH_U_L110,<br>CH_M_R030, CH_M_R110, CH_U_R030, CH_U_R110 | Center<br>Left<br>Left<br>Right |
| 18 | 14 | CH_M_000, CH_U_000, CH_T_000,<br>CH_LFE1,<br>CH_M_L030, CH_M_L110, CH_M_L150,<br>CH_U_L030, CH_U_L110,<br>CH_M_R030, CH_M_R110, CH_M_R150,<br>CH_U_R030, CH_U_R110 | Center<br>Left<br>Left<br><br>Right |
| 19 | 12 | CH_M_000,<br>CH_LFE1,<br>CH_M_L030, CH_M_L135, CH_M_L090,<br>CH_U_L030, CH_U_L135,<br>CH_M_R030, CH_M_R135, CH_M_R090,<br>CH_U_R030, CH_U_R135 | Center<br>Left<br>Left<br><br>Right |
| 20 | 14 | CH_M_000,<br>CH_LFE1,<br>CH_M_L030, CH_M_L135, CH_M_L090, CH_U_L045,<br>CH_U_L135, CH_M_LSCR,<br>CH_M_R030, CH_M_R135, CH_M_R090, CH_U_R045,<br>CH_U_R135, CH_M_RSCR | Center<br>Left<br>Left<br><br>Right |

Table 12 illustrates a syntax of mpegh3daChannelPairElementConfig( ) according to an embodiment of the present invention.

For internal channel processing, as shown in Table 15, mpegh3daChannelPairElementConfig( ) must be corrected such that isInternal Channel Processed( ) is processed after processing Mps212Config( ) when stereoConfigIndex is greater than 0.

TABLE 12

| Syntax | No. of bits | Mnemonic |
|---|---|---|
| mpegh3daChannelPairElementConfig(sbrRatioIndex) | | |
| { | | |
| mpegh3daCoreConfig( ); | | |
| if (enhancedNoiseFilling) { | | |
| igfIndependentTiling; | 1 | bslbf |
| } | | |
| if (sbrRatioIndex > 0) { | | |
| SbrConfig( ); | | |
| stereoConfigIndex; | 2 | uimsbf |
| } else { | | |
| stereoConfigIndex = 0; | | |
| } | | |
| if (stereoConfigIndex > 0) { | | |
| Mps212Config(stereoConfigIndex); | | |
| isInternalChannelProcessed | 1 | uimsbf |
| } | | |
| qceIndex; | 2 | uimsbf |
| if(qceIndex > 0) { | | |
| shiftIndex0; | 1 | uimsbf |
| if(shiftIndex0 > 0) { | | |
| shiftChannel0; | nBits[1)] | |
| } | | |
| } | | |
| shiftIndex1; | 1 | uimsbf |
| if(shiftIndex1 > 0) { | | |
| shiftChannel1; | nBits[1)] | |
| } | | |
| } | | |

[1)]nBits = floor(log2(numAudioChannels + numAudioObjects + numHOATransportChannels + numSAOCTransportChannels − 1)) + 1

FIG. 4 is a detailed block diagram of a unit configured to apply an ICG to an internal channel signal in a decoder, according to an embodiment of the present invention.

When an ICG is applied to a decoder since conditions that speakerLayoutType==3, isInternalProcessed is 0, and a reproduction layout is stereo are satisfied, an internal channel processing process as shown in FIG. 4 is performed.

The ICG application unit disclosed in FIG. 4 includes an ICG acquisition unit 410 and a multiplier 420.

When a case where an input CPE consists of a channel pair of CH_M_000 and CH_L_000 is assumed, if mono QMF sub-band samples 430 in the CPE are input, the ICG acquisition unit 410 acquires an ICG by using CLDs. The multiplier 420 acquires an internal channel signal ICH_A 440 by multiplying the received mono QMF sub-band samples by the acquired ICG.

An internal channel signal may be simply reconfigured by multiplying mono QMF sub-band samples by an ICG $G_{ICH}^{l,m}$. Herein, l denotes a time index, and m denotes a frequency index.

As described above, a covariance operation of an FC is reduced by using an internal channel, thereby significantly reducing a required computation amount. However, (1) "fixed" multiple gain values and EQ values defined in a conversion rule matrix must be multiplied by single QMF band samples, (2) an up-mixing process and a mixing process are required, and (3) a power normalization process is required, and thus it is necessary that a computation amount is more reduced.

Therefore, by considering that one CLD data can be applied to a plurality of QMF sub-band samples, an ICG may be defined based on CLD data. The ICG defined based on CLD data may cover the three processes mentioned above and may be used for multiplication of a plurality of QMF sub-band samples, and thus complexity of a process of generating an internal channel signal may be reduced.

When conditions that speakerLayoutType==3, isInternalProcessed is 0, and a reproduction layout is stereo without a deviation are satisfied, an ICG $G_{ICH}^{l,m}$ such as formula 1 may be defined.

Formula 1

$$G_{ICH}^{l,m} = \sqrt{\frac{\left(c_{left}^{l,m} \times G_{left} \times G_{EQ,left}^{m}\right)^2 + \left(c_{right}^{l,m} \times G_{right} \times G_{EQ,right}^{m}\right)^2}{\left(c_{left}^{l,m} \times G_{left} \times G_{EQ,left}^{m} + c_{right}^{l,m} \times G_{right} \times G_{EQ,right}^{m}\right)^2}} \times \left(c_{left}^{l,m} \times G_{left} \times G_{EQ,left}^{m} + c_{right}^{l,m} \times G_{right} \times G_{EQ,right}^{m}\right),$$

where $c_{left}^{l,m}$ and $c_{right}^{l,m}$ denote panning coefficients of a CLD, $G_{left}$ and $G_{right}$ denote gains defined in an format conversion rule, and $G_{EQ,left}^{m}$ and $G_{EQ,right}^{m}$ denote gains of an mth band defined in the format conversion rule.

By using the ICG defined by formula 1, complexity of a series of processes of (1) performing up-mixing by using a CLD, (2) multiplying gains and EQ, and (3) mixing and power-normalizing a signal for a CPE may be reduced.

FIG. 5 is a decoding block diagram of a case where an ICG is pre-processed in an encoder, according to an embodiment of the present invention.

When an ICG is applied in an encoder and transmitted since conditions that speakerLayoutType==3, isInternalProcessed is 1, and a reproduction layout is stereo are satisfied, an internal channel processing process as shown in FIG. 5 is performed.

The encoder generates a CPE signal down-mixed by using a spatial parameter such as a CLD. Therefore, when an ICG derived from the spatial parameter CLD and a conversion rule matrix is multiplied by the CPE signal down-mixed in the encoder, the down-mixed CPE signal may be used as an internal channel signal when a reproduction layout is stereo.

That is, when a reproduction layout is stereo, by pre-processing an ICG corresponding to a CPE in an MPEG-H 3D audio encoder, MPS212 may be by-passed in a decoder, and thus a decoder complexity may be further reduced.

However, when a reproduction layout is not stereo, internal channel processing is not performed, and thus a process of restoring an original signal by multiplying the down-mixed CPE signal by a reciprocal number $$\frac{1}{G_{ICH}^{l,m}}$$

of an ICG, MPS212-processing the multiplication result is necessary.

Since a case where the most computations according to a number difference between input channels and output channels in a down-mix process for format conversion are required is a case where a reproduction layout is a stereo layout, for another reproduction (output) layout instead of stereo, a decoder load occurring due to an additional decoding process of multiplying an inverse ICG is ignorable.

Like FIGS. 3 and 4, a case where an input CPE consists of a channel pair of CH_M_000 and CH_L_000 is assumed. When mono QMF sub-band samples 540 with an ICG pre-processed in an encoder are input, a decoder determines 510 whether an output layout is stereo.

If the output layout is stereo, this is a case where an internal channel is used, and thus, the received mono QMF sub-band samples 540 are output as an internal channel signal for an internal channel ICH_A 550. However, if the output layout is not stereo, internal channel processing does not use an internal channel, and thus inverse ICG processing 520 is performed to restores 560 an internal channel-processed signal, and the restored signal is MPS212 up-mixed 530 to output signals for both CH_M_000 571 and CH_L_000 572.

When a load due to covariance analysis of an FC becomes a problem is a case where the number of input channels is large, whereas the number of output channels is small, and thus a case where an output layout in MPEG-H audio is stereo has the highest decoding complexity.

However, for another output layout instead of stereo, a computation amount added to multiply a reciprocal number of an ICG is (five multiplications, two additions, one division, one square root≈55 operations)×(71 bands)×(two parameter sets)×(48000/2048)×(13 internal channels) and is about 2.4 MOPS when a case of two sets of CLDs for each frame is assumed, and thus this is not applied as a large load to a system.

After generating the internal channel, QMF sub-band samples of the internal channel, the number of internal channels, and a type of each internal channel are transmitted to an FC, and the number of internal channels is used to determine a size of a covariance matrix in the FC.

An inverse ICG IG is calculated by formula 2 by using MPS parameters and format conversion parameters.

$$IG_{ICH}^{l,m} = \frac{1}{\sqrt{\left(c_{left}^{l,m} \times G_{left} \times G_{EQ,left}^{m}\right)^2 + \left(c_{right}^{l,m} \times G_{right} \times G_{EQ,right}^{m}\right)^2}} \quad \text{Formula 2}$$

where $c_{left}^{l,m}$ and $c_{right}^{l,m}$ denotes inverse-quantized linear CLD values of an lth time slot and an mth hybrid MQF band for a CPE signal, $G_{left}$ and $G_{right}$ denote a value of a gain column for an output channel, which is defined in ISO/IEC 23008-3 Table 96, i.e., a format conversion rule table, and $G_{EQ,left}^{m}$ and $G_{EQ,right}^{m}$ denote gains of an mth band of EQ for an output channel, which are defined in the format conversion rule table.

The above-described embodiments according to the present invention may be implemented as computer instructions which may be executed by various computer means, and recorded on a computer-readable recording medium. The computer-readable recording medium may include program commands, data files, data structures, or a combination thereof. The program commands recorded on the computer-readable recording medium may be specially designed and constructed for the present invention or may be known to and usable by one of ordinary skill in a field of computer software. Examples of the computer-readable medium include magnetic media such as hard discs, floppy discs, or magnetic tapes, optical recording media such as compact disc-read only memories (CD-ROMs), or digital versatile discs (DVDs), magneto-optical media such as floptical discs, and hardware devices that are specially configured to store and carry out program commands, such as ROMs, RAMs, or flash memories. Examples of the program commands include a high-level language code that may be executed by a computer using an interpreter as well as a machine language code made by a complier. The hardware devices can be changed to one or more software modules to carry out processing according to the present invention, and vice versa.

While the present invention has been described with reference to specific features such as specific components, limited embodiments, and drawings, these are only provided to help the general understanding of the present invention, the present invention is not limited to the embodiments, and those of ordinary skill in the art to which the present invention belongs may attempt various modifications and changes from the disclosure.

Therefore, the idea of the present invention should not be defined only by the embodiment described above, and not only the claims described below but also all the scopes equivalent to the claims or equivalently changed from the claims will belong to the category of the idea of the present invention.

The invention claimed is:

1. A method of processing an audio signal, the method comprising:

receiving a channel pair element (CPE) to which an internal channel gain (ICG) has been pre-applied;

when a reproduction channel configuration is not stereo, calculating an inverse ICG for the CPE based on Motion Picture Experts Group surround 212 (MPS212) parameters and rendering parameters defined in a format converter according to MPS212 output channels; and generating an output signal based on the received CPE and the calculated inverse ICG.

2. The method of claim 1, wherein the inverse ICG $IG_{ICH}^{l,m}$ is calculated by using $$IG_{ICH}^{l,m} = \frac{1}{\sqrt{\left(c_{left}^{l,m} \times G_{left} \times G_{EQ,left}^{m}\right)^2 + \left(c_{right}^{l,m} \times G_{right} \times G_{EQ,right}^{m}\right)^2}},$$

where l denotes a time slot index, m denotes a frequency band index, $c_{left}^{l,m}$ and $c_{right}^{l,m}$ are channel level difference (CLD) values for the CPE, $G_{left}$ and $G_{right}$ are gain values defined in the format converter according to the MPS212 output channels, and $G_{EQ,left}^{m}$ and $G_{EQ,right}^{m}$ are equalization (EQ) gain values defined in the format converter according to the MPS212 output channels.

3. The method of claim 1, wherein the audio signal is an immersive audio signal.

4. A device for processing an audio signal, the device comprising:

a receiver configured to receive a channel pair element (CPE) to which an internal channel gain (ICG) has been pre-applied; and an output signal generator configured to, when a reproduction channel configuration is not stereo, calculate an inverse ICG for the CPE based on Motion Picture Experts Group surround 212 (MPS212) parameters and rendering parameters defined in a format converter according to MPS212 output channels and generate an output signal based on the received CPE and the calculated inverse ICG.

5. The device of claim 4, wherein the inverse ICG $IG_{ICH}^{l,m}$ is calculated by using $$IG_{ICH}^{l,m} = \frac{1}{\sqrt{\left(c_{left}^{l,m} \times G_{left} \times G_{EQ,left}^{m}\right)^2 + \left(c_{right}^{l,m} \times G_{right} \times G_{EQ,right}^{m}\right)^2}},$$

where l denotes a time slot index, m denotes a frequency band index, $c_{left}^{l,m}$ and $c_{right}^{l,m}$ are channel level difference (CLD) values for the CPE, $G_{left}$ and $G_{right}$ are gain values defined in the format converter according to the MPS212 output channels, and $G_{EQ,left}^{m}$ and $G_{EQ,right}^{m}$ are equalization (EQ) gain values defined in the format converter according to the MPS212 output channels.

6. The device of claim 4, wherein the audio signal is an immersive audio signal.

7. A non-transitory computer-readable recording medium having recorded thereon a computer program for executing the method of claim 1.

* * * * *